No. 798,568. PATENTED AUG. 29, 1905.
A. Z. CLARK.
APPARATUS FOR TREATING CRUSHED ORES, SLIMES, AND OTHER MATERIALS.
APPLICATION FILED JAN. 5, 1905.

2 SHEETS—SHEET 1.

Witnesses:
Inventor
Alfred Z. Clark

No. 798,568. PATENTED AUG. 29, 1905.
A. Z. CLARK.
APPARATUS FOR TREATING CRUSHED ORES, SLIMES, AND OTHER MATERIALS.
APPLICATION FILED JAN. 5, 1905.

2 SHEETS—SHEET 2.

UNITED STATES PATENT OFFICE.

ALFRED Z. CLARK, OF MELBOURNE, VICTORIA, AUSTRALIA.

APPARATUS FOR TREATING CRUSHED ORES, SLIMES, AND OTHER MATERIALS.

No. 798,568.     Specification of Letters Patent.     Patented Aug. 29, 1905.

Application filed January 5, 1905. Serial No. 239,812.

*To all whom it may concern:*

Be it known that I, ALFRED Z. CLARK, a subject of the King of Great Britain, residing at No. 90 Queen street, Melbourne, in the State of Victoria and Commonwealth of Australia, have invented certain new and useful Improvements in Apparatus for Treating Crushed Ores, Slimes, and other Materials, of which the following is a specification.

My improvements in apparatus for treating crushed ores, slimes, tailings, alluvial, and other wash-dirt for the recovery of metals or gems therefrom relate to that class of apparatus in which agitation is the principal factor, and they have been devised for the purpose of providing a much more effective agitation than is attainable by any other apparatus at present in use.

By my invention amalgamation, concentration, and separation are materially assisted, and, if desired, chemical solutions may be added to the material being treated in order to dissolve any metals contained therein.

The invention consists of the construction and arrangement of the several parts, which will be more fully hereinafter set forth.

Figure 1:
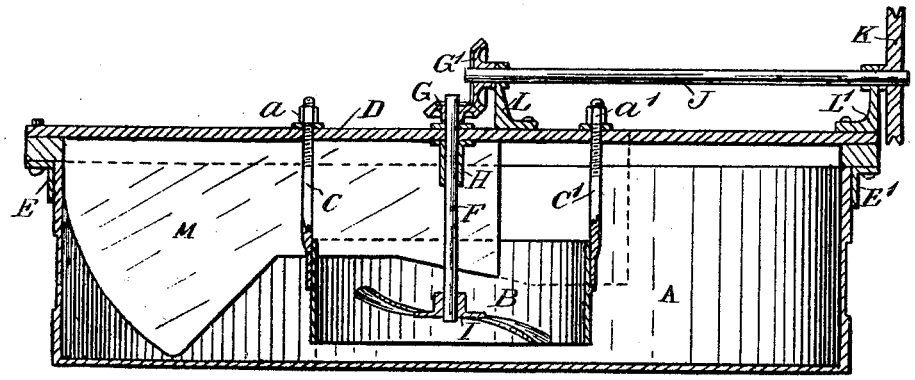
Figure 2:
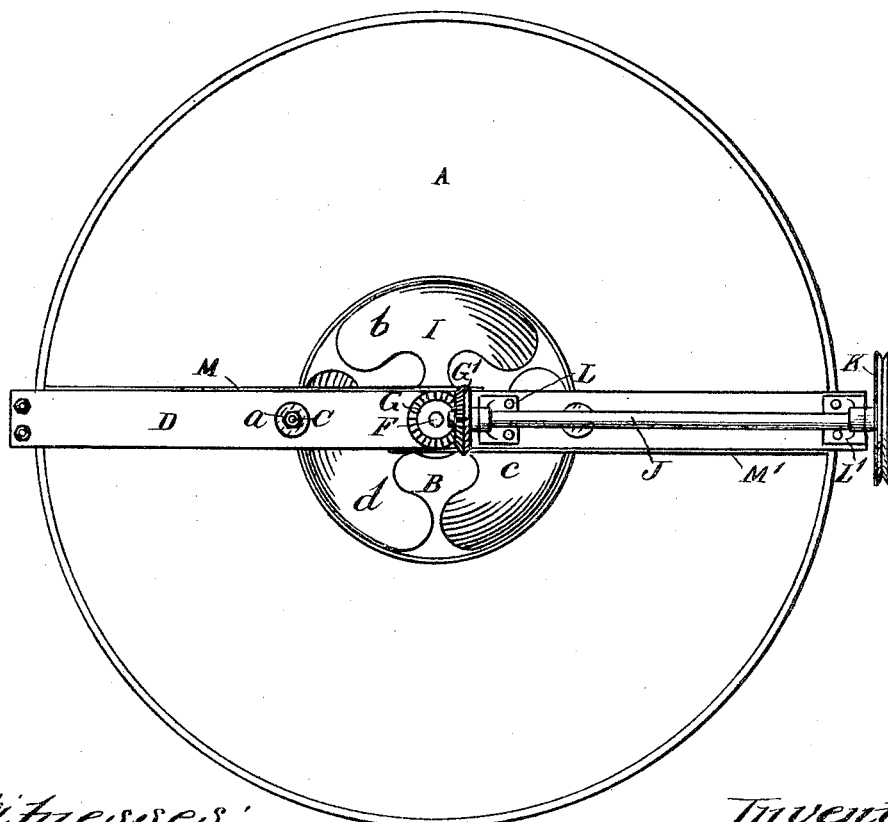
Figure 3:
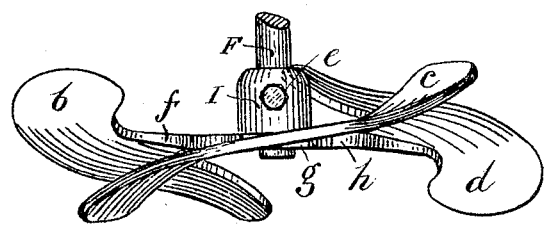
Figure 4:
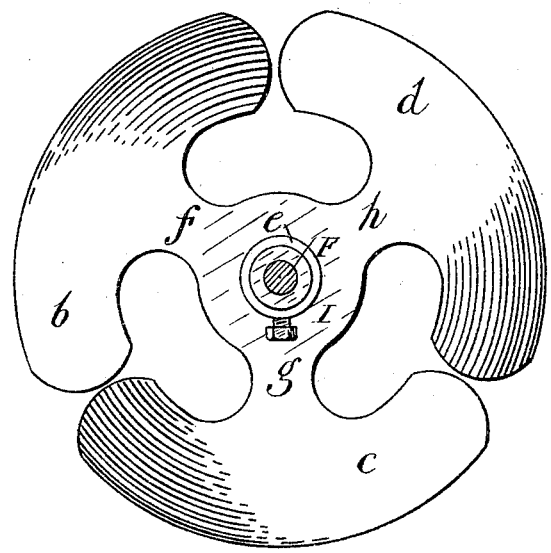
Figure 5:
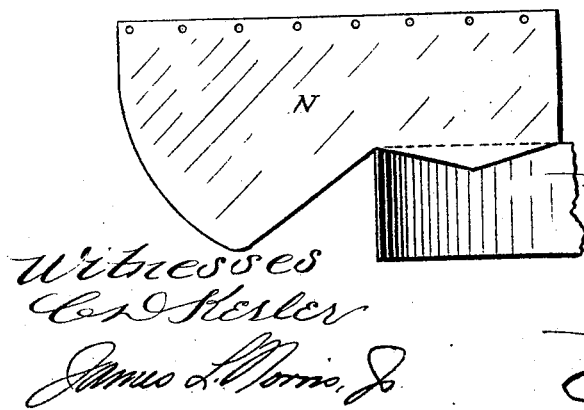
Figure 6:
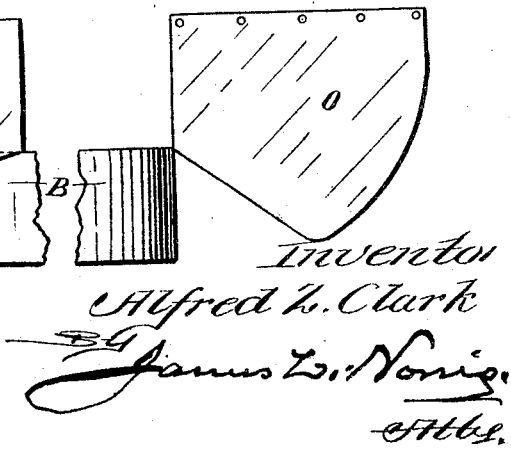

Referring to the drawings hereto annexed, in which similar letters refer to similar parts throughout the several views, Figure 1 is a sectional elevation of my apparatus. Fig. 2 is a plan of Fig. 1. Fig. 3 is an elevation of the propeller I prefer to use. Fig. 4 is a plan of the propeller. Figs. 5 and 6 are views in elevation of two modified forms of deflecting-plates.

A is a tank or vat.

B is a cylinder supported in the center of the tank A by means of two vertical shafts C C', which pass through a horizontal beam or girder D, attached to the top of the tank or vat A, said cylinder being capable of being raised or lowered by means of nuts $a$ $a'$, working on the screw-threaded ends of said shafts C C' and bearing on top of the girder D. The girder D passes across the center of and is raised above the top of the tank A by means of blocks resting on brackets E E', fitted to the top edge of the said tank or vat A.

F is a vertical shaft which passes perpendicularly through the center of the tank A and cylinder B, its lowermost end being about six inches from the bottom of the said tank A and having a propeller I keyed or otherwise attached thereto. The uppermost end of said shaft F projects through the center of the girder D and has a beveled wheel G keyed firmly thereto, said wheel G resting on the top of the girder D and holding the shaft F in position.

H is a long boss attached underneath and about the center of the girder D and which forms a suitable bearing for the shaft F.

Gearing into the beveled wheel G on the vertical shaft F is another beveled wheel G', which is keyed on the end of a horizontal shaft J, the opposite end of which projects beyond the edge of the tank A and has a grooved or ordinary belt-wheel K fitted to the end thereof. The said shaft J is supported on standards L and L', which are bolted to the top of the girders D.

M M' represent the form of deflecting-plates I prefer to use when treating crushed ores, sand, and slimes. They are securely fastened to opposite sides of the girder D by means of bolts or rivets, (not shown,) and said plates extend from the periphery of the vat to a little beyond the center of the vertical cylinder B.

N and O are two modified forms of deflecting-plates, the former, like that illustrated in Fig. 1, being suitable for use when treating sand and slimes and the latter when treating wash-dirt. In the latter case the plate only extends from the inner periphery of the vat A to the outside periphery of the vertical cylinder B. When these deflecting-plates are used for sand or slimes, they may extend from the periphery of the tank or vat A to a point beyond said vertical cylinder, as shown in dotted lines in Fig. 1.

The propeller I has three helically-curved blades $b$ $c$ $d$, which are connected at their centers to the boss $e$ by arms $f$ $g$ $h$. The propeller may be cast in one piece, or, if found more desirable, the blades $b$ $c$ $d$ may be cast separately and bolted at their centers to the arms $f$ $g$ $h$ of the boss $e$.

The mode of operation is as follows: The tank or vat A is first charged with the material to be treated, together with the requisite quantity of water (and when required cyanid solution) to completely fill the tank or vat. Motion is then given to the vertical shaft F (carrying the propeller I) from any source of power through the intervention of belt-wheel K, shaft J, and bevel-wheels G G', with the result that the contents of the tank, if the propeller is driven in a right-handed direction, are drawn to the center thereof and pass through the vertical cylinder B from the bottom to the top, this action being repeated again and again until the operation is completed and insuring a most complete and violent agitation of the contents. It will of course be well understood that if the propeller be driven in a left-handed direction the material passes in the reverse direction through the cylinder to what it does when the propeller is driven in a right-handed direction.

Having now fully described and ascertained my said invention and the manner in which it is to be performed, I declare that what I claim is—

1. In an apparatus for treating crushed ores, slimes, tailings, and alluvial and other wash-dirt for the recovery of metals or gems therefrom, the combination with a vat or tank, of a vertical cylinder in the tank and open at the top and bottom, a propeller rotatably disposed in the lower portion of the cylinder and having its blades operating above the lower edge of said cylinder, and stationary deflecting-plates depending into the tank at opposite points with relation to the cylinder, the said cylinder and deflecting-plates having their lower terminals above the bottom of the tank or vat.

2. In an apparatus for treating crushed ores, slimes, tailings and the like for the recovery of metals or gems therefrom, the combination with a circular tank or vat, of a vertically-adjustable cylinder suspended within the tank or vat, a propeller disposed in the lower extremity of the cylinder and having its blades operating above the lower edge of the latter, and deflecting-plates depending into the tank or vat with respect to opposite portions of the cylinder and extending from the periphery of the tank or vat to a point slightly beyond the center of the cylinder, the lower terminals of the edges of the cylinder and plates being normally above the bottom of the tank or vat.

3. In an apparatus of the class set forth, the combination with a tank or vat, a girder extending diametrically across and supported on the upper portion of the tank or vat, a cylinder vertically depending into the vat and having means adjustably connecting the same to the girder, a propeller having a shaft projecting upwardly through the center of the girder, the said propeller being located in the lower portion of the cylinder, and deflecting-plates attached to the opposite side edges of the girder between the tank and the cylinder.

In testimony whereof I have hereunto set my hand in presence of two subscribing witnesses.

ALFRED Z. CLARK.

Witnesses:
 WALTER S. BAYSTON,
 FRANK BAYSTON.